United States Patent [19]

Brandeau

[11] 4,378,323
[45] Mar. 29, 1983

[54] METHOD OF PRODUCING PLASTIC COLLAR INTEGRAL WITH A CABLE JACKET

[75] Inventor: Edward P. Brandeau, Willimantic, Conn.

[73] Assignee: Akzona Incorporated, Asheville, N.C.

[21] Appl. No.: 76,637

[22] Filed: Sep. 18, 1979

Related U.S. Application Data

[62] Division of Ser. No. 828,063, Aug. 26, 1977, Pat. No. 4,216,351.

[51] Int. Cl.³ .............................................. H05B 11/00
[52] U.S. Cl. .................................... 264/27; 156/273.9; 264/105
[58] Field of Search ................ 264/27, 105; 156/273.9

[56] References Cited

U.S. PATENT DOCUMENTS

| | | | |
|---|---|---|---|
| 2,487,985 | 11/1949 | Ruben | 156/273.9 |
| 2,695,853 | 11/1954 | Foreit | 264/27 |
| 2,914,181 | 11/1959 | Naflulin et al. | 264/27 |
| 3,062,940 | 11/1962 | Bauer et al. | 264/27 |
| 3,381,082 | 4/1968 | Peterson | 174/93 |
| 3,393,257 | 7/1968 | Cable | 264/27 |
| 3,775,204 | 11/1973 | Thompson et al. | 174/92 |
| 4,135,587 | 1/1979 | Diaz | 174/92 |

Primary Examiner—James H. Derrington
Attorney, Agent, or Firm—Francis W. Young; David M. Carter

[57] ABSTRACT

There is provided a plastic collar integral with the outer jacket of a cable. The plastic material includes a mixture of a plastic and an electrically conductive material such as carbon black. The plastic is melt bonded to the cable jacket by applying electric current through the material, thus melting the material onto the jacket of the cable. Upon melting, the semi-conductive plastic may be molded into the desired form, and upon cooling, it becomes bonded to the cable jacket. The collar may be used as a seal for the ends of a cable splice closure as well as a shoulder for securing a sealing gasket to a cable for use in such closures. The collar also may be used as strain-relief for the conductors which are inside the cable as well as other uses.

3 Claims, 8 Drawing Figures

METHOD OF PRODUCING PLASTIC COLLAR INTEGRAL WITH A CABLE JACKET

This is a division of application Ser. No. 828,063, filed Aug. 26, 1977, now U.S. Pat. No. 4,216,351.

BACKGROUND OF THE INVENTION

This invention relates to a plastic collar integral with the outer jacket of a cable. More particularly it relates to a plastic collar melt bonded to a cable jacket for providing a seal for cable splice closure as well as strain relief for the cable.

In field installation of telephone cable, it is often necessary to splice the ends of cables together. The actual splice connections are made between the ends of the corresponding communication conductors within each cable. A portion of the jacket and shield are removed from the ends of each cable to be spliced, exposing the conductors to moisture. In order to avoid corrosion of the conductors and other hazards, it is necessary to enclose the spliced conductors with a cable splice closure. A splice closure normally includes a hollow shell having two halves. An example of a standard telephone splice closure 1 is shown in FIG. 1.

It is highly desirable to properly seal the splice closure to ensure that moisture will not leak into the closure causing the abovementioned corrosion of the conductors as well as deterioration of the conductor insulation and possibly the shield. Furthermore, it is desirable to provide strain relief for the cable so that the connected conductors do not pull apart under mechanical load.

In one mode of the present state of the art, telephone cables have been prepared for splicing by wrapping a sticky tape, such as B-sealing tape, about the cable jacket near the end to be spliced. The tape-wound end of the cable 2 was placed in contact with the inside of ends 3 of the splice closure indicated in FIG. 1. The tape was put under compression when the halves of the splice closure were secured together by screws 4 in an effort to moisture-seal the ends of the closure. Strain relief ring clamps were also clamped tightly about the cable and connected to the splice closure ends in an attempt to prevent the wire splice connections from coming loose when the cable was under load.

It has been found, however, that the use of these seal and strain relief techniques often does not work well. The adhesive bond between the tape and jacket is of insufficient strength, thus with the cable under tension, the tape quite often works itself loose thus allowing moisture to penetrate the closure. Furthermore, to properly fill the inside of the end 3 of splice closure with tape requires care, i.e., wrapping the cable with the particular number of turns and in a precise manner for a particular cable diameter and closure size. Quite often the tape is not properly wrapped about the cable. Also, resealing the closure in the event that the closure is reentered is a cumbersome and difficult task with the use of sticky tape. It has also been found that the use of a strain relief clamp about the cable jacket has damaged the cable jacket as well as the components in the core of the cable.

In an attempt to alleviate some of these problems, splice closure sleeves have been designed which are melted onto the cable jacket by a separate heat source. Normally the heat source was an enamel copper resistance wire embedded between polyethylene folds. An example of this type splice seal approach may be seen in the *Proceedings of the 24th Wire and Cable Symposium of the 18th, 19th and 20th of November,* 1975, in an article entitled "Welded Polyethylene Splice Closures—A Reliable Alternative" by Dale F. Giles of the Siemans Corporation, pages 99 to 103. One of the problems with this type of splice seal is that it requires a separate heat source, such as the polyethylene heating tape with resistance wire embedded therein which must be very carefully placed with respect to the pre-molded polyethylene sleeves. Furthermore, because the heating tape is placed between the cable jacket and the sleeve, an inadequate bond between the sleeve and cable may result. Furthermore, this resistance wire technique is rather expensive and tedious to install. Also, the use of a separate heating source such as resistance wires or, in some cases, a blow torch, often damaged the cable jacket. It is, therefore, desirable to provide a cable splice seal and strain relief which overcomes the problems of the prior art.

OBJECTS OF THE INVENTION

It is one object of this invention to provide a plastic collar integral with a cable jacket.

Another object of this invention is to provide an improved seal for cable splice closures.

There is another object of this invention to provide improved strain relief for cable.

There is still another object of this invention to provide an apparatus and a process for melt bonding a plastic collar onto the jacket of a cable by passing an electric current through the plastic.

There is a further object of this invention to provide a collar melt bonded to a cable for securing a gasket seal for a cable splice closure.

There is still another object of this invention to provide a semi-conductive gasket integral with the jacket of a cable for providing both strain relief for the cable and a moisture seal for cable splice closures.

SUMMARY OF THE INVENTION

In accordance with one form of this invention, there is provided a semi-conductive plastic collar integral with the jacket of a cable. The collar is made integral with the jacket by passing an electrical current through semi-conductive plastic material while it is held in contact with the jacket. The current and the material's internal resistance causes it to become molten thus the material is melt-bonded to the jacket. The collar may be adapted to serve several functions such as the seal member for the end portion of a cable splice closure or a strain relief member or both. Furthermore, the collar may be adapted to secure a gasket to the cable which seals the end of a cable splice closure.

There is further provided a method for forming a plastic material integral with a cable jacket. The method includes the steps of placing semi-conductive plastic material in contact with a cable jacket, passing electric current through the semi-conductive plastic material at a sufficient level and for a sufficient time to melt the material and bond it to the cable jacket, and forming the semi-conductive plastic material to the desired shape.

There is also provided apparatus for forming a collar integral with a cable jacket. A semi-conductive material is in contact with the jacket. First and second spaced-apart electrodes are in further contact with the material.

The electrodes are connected to a source of electrical energy for melt-bonding the material to the jacket.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawings, in which:

DESCRIPTION OF THE PREFERRED EMBODIMENTS

Figure 3:
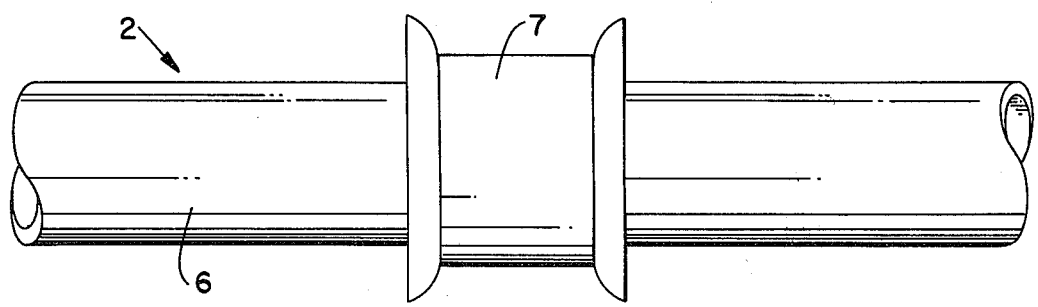
FIG. 3 is a side view of a portion of a cable and a semi-conductive plastic collar integral with the cable jacket incorporating some of the features of this invention.

Refer now more particularly to FIG. 3. There is provided cable 2 having an outer jacket 6 made of plastic material, which, in this embodiment, is polyethylene. Plastic collar 7 is integral with the jacket 6. The collar may be made of a material including a mixture of a plastic type polymer such as, in this embodiment, polyethylene and an electrically conductive carbon black. The semi-conductive plastic material utilized may be initially in the form of various physical structures, such as pellets or tape. Semi-conductive plastics are available from A. Shulman Company, Akron, Ohio, for example.

The semi-conductive plastic collar 7 is formed and made integral with the cable jacket by placing semi-conductive plastic material in contact with the cable jacket and applying electric current through the semi-conductive plastic material of sufficient level and time so that the material is melt-bonded or welded to the jacket. Various means of accomplishing this may be provided.

Figure 4:
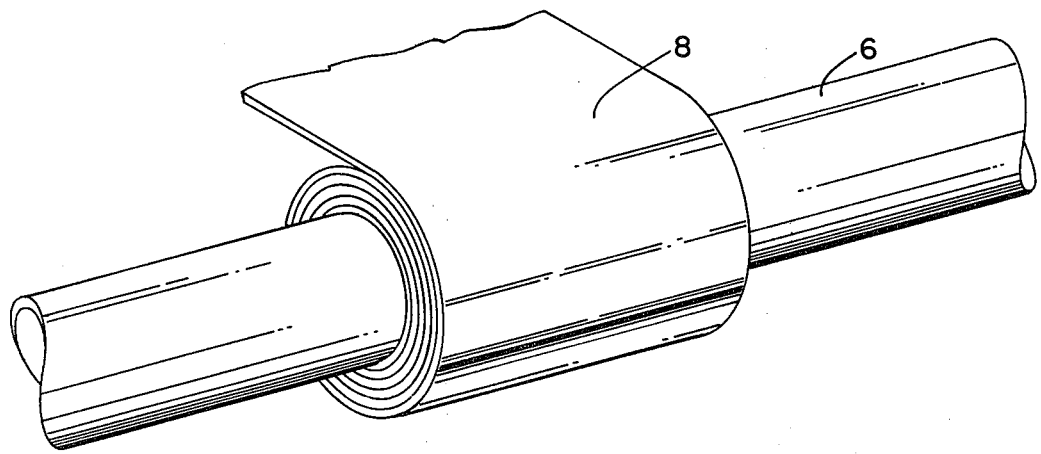
FIG. 4 is an isometric view of a portion of a cable wrapped with semi-conductive plastic tape prior to its being melt-bonded onto the cable incorporating some of the aspects of this invention.

In the embodiment of FIG. 4, semi-conductive plastic tape material 8 is wound a number of times about cable jacket 6. The tape material may be wrapped, for example, fifty turns about the cable; however, the application of the tape 8 to the jacket does not require the precise wrapping as needed in the use of sticky tape discussed previously. The tape 8 may be semi-conductive 20 mil thick tape which has a polyethylene polymer base mixed with a highly conductive carbon black. The cable jacket 6 in this embodiment is made from standard telephone cable jacket polyethylene base material.

Figure 5:
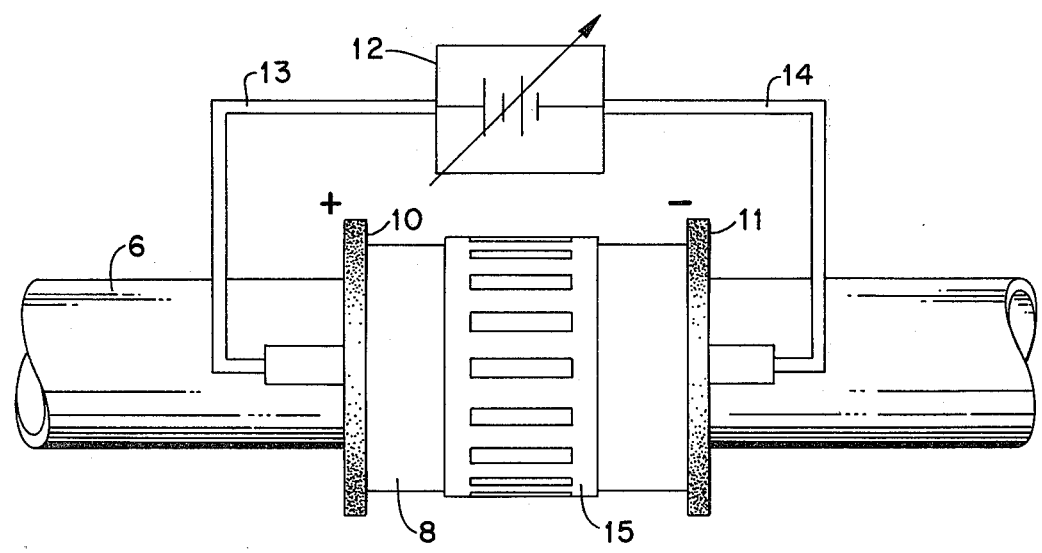
FIG. 5 is a side view of an apparatus for melt-bonding semi-conductive plastic material onto a cable jacket incorporating some of the features of the invention.

FIG. 5 shows an apparatus for melting the semi-conductive plastic material 8, which in this embodiment is in tape form, to the cable jacket 6. The apparatus includes positive electrode 10 and negative electrode 11, both of which are annular shaped, pressed against opposite ends of the semi-conductive plastic material 8. The electrodes are connected to a variable voltage supply 12, which provides the electrical energy for melting the material, by conductors 13 and 14. Variable supply 12 may be a commercially available power supply, such as a variable D.C. power supply. A 60 cycle A.C. Variac may also be used.

Sufficient inward axial pressure is applied to the electrodes for providing enough contact between each electrode and the semi-conductive plastic material for current to flow through the material. This axial pressure may be applied by hand, using insulated gloves, or by such means as insulated C-clamps. The heat generated within the semi-conductive plastic material itself causes it to melt uniformly throughout its volume. Hose clamp 15 is secured about the material 8 to apply radial pressure to the semi-conductive plastic material for ensuring that the semi-conductive plastic material will bond to the cable jacket. The electrodes and the hose clamp also tend to hold the semi-conductive plastic in place during melt as well as produce the resulting collar shape of the material as shown in FIG. 3 with shoulders at each end.

The volume resistivity of the semi-conductive plastic material varies as a function of the percentage of the polymer plastic base and the conductive carbon black material—that is, the more carbon black added, the lower the resistivity. The resistivity of the semi-conductive plastic material should be such that upon the application of a predetermined voltage across the material, the material will melt and form a substantial bond to the cable jacket. In the previously mentioned embodiment of FIG. 5, a 60 cycle current of about 10 amperes at about 10 volts for 2 minutes was applied to a Shulman's semi-conductive polyethylene plastic tape. The tape had a volume resistivity in the range from 1 to 100 ohm-cm. The semi-conductive plastic tape was thus melt bonded to the cable jacket.

In order to ensure a substantial bond, the collar and cable jacket, in the preferred embodiment, should be made of a similar polymeric base material. For example, if the cable jacket is polyethylene, a semi-conductive plastic material with a polyethylene plastic base should be used.

Figure 6:
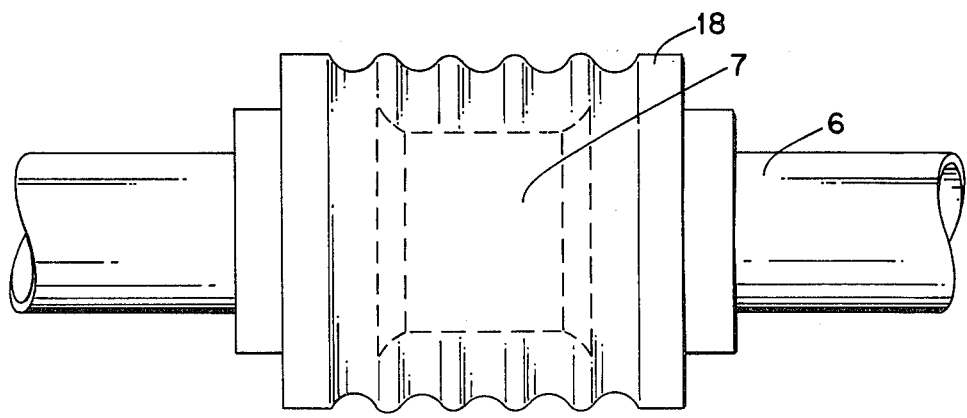
FIG. 6 is a side view of the cable having a semi-conductive collar integral with a cable jacket securing a gasket to the cable incorporating still other features of the invention.
Figure 7:
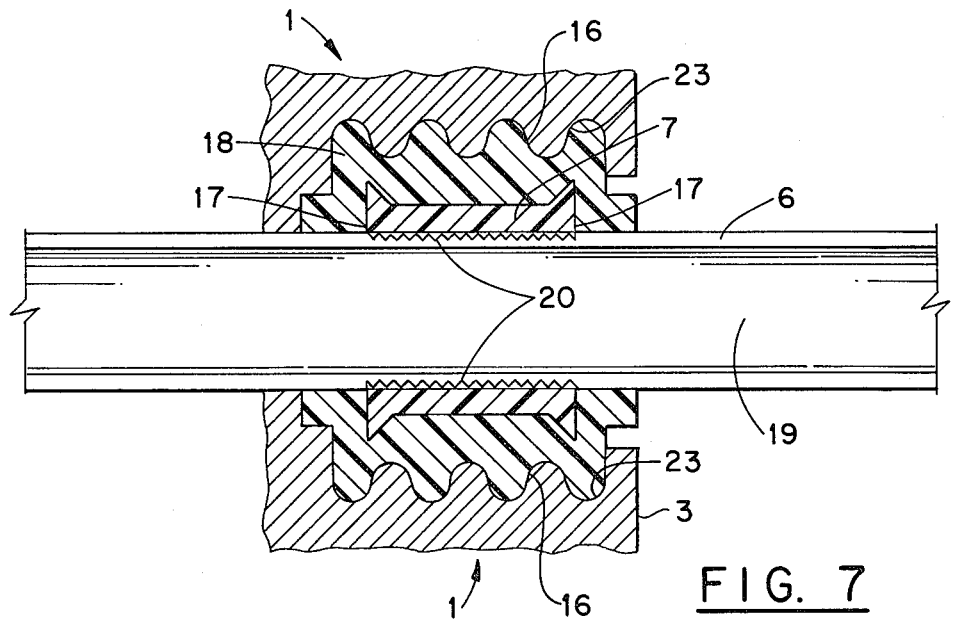
FIG. 7 is a cross-sectional view of FIG. 6 shown with a partial cross-section of the end portion of the closure of FIG. 2.

Once the collar has been formed onto the cable jacket, it may be used for such purposes as providing a moisture seal for splice closure, strain relief for a cable, as well as a shoulder for securing other apparatus on the cable and other uses. One such example of the use of a semi-conductive plastic collar bonded to a cable jacket is shown in FIGS. 6 and 7. FIG. 6 shows (in dotted outline) collar 16 bonded to cable jacket 6. A rubber gasket 18 is secured onto the cable by collar 7. The rubber gasket has a portion of its inner hollow dimensions roughly equal to the volumetric displacement of the collar. This, as well as the bond between the collar and the jacket, may be more readily seen with reference to FIG. 7.

FIG. 7 is a cross-sectional view of the collar, cable and gasket of FIG. 6. For clarity, the conductors are not shonw; however, there would be a plurality of conductors in the cable core 19. As can be seen, collar 7 is fuse-bonded or welded to the polyethylene cable jacket 6 shown by the boundary area 20. The semi-conductive plastic migrates into the boundary area 20 of the jacket during melt and remains there after it is cooled. There is an actual molecular bond between the semi-conductive plastic base polymer and the base polymer of the cable jacket, thus providing a very strong bond. The rubber gasket 18 is connected over the collar 7 and thus is secured to the cable. The inside walls 17 of the opposite ends of the gasket abut the sides of the collar so that the gasket is secured in the longitudinal direction.

This rubber gasket may be used as a moisture seal in the inside of end portions 3 of cable splice closure 1. The volumetric displacement dimensions of the gasket 18 are similar to but slightly larger than the hollow dimensions of the inside ends 3 of the splice closure. The grooves and peaks 16 in the ends of the splice closure tightly mesh with the grooves and peaks 23 of the gasket. The splice closure is bolted together so that the end portion 3 is squeezed down on the gasket forming a watertight seal at the ends of the splice closure. The gasket 18 shown in FIG. 7 may not only be a secured rubber gasket, as described above, but it also may be made of a single piece of semi-conductive plastic, as will be described later.

Not only does collar 7 act to secure the gasket 18 onto the cable, it also acts as a strain relief for the cable since it is fuse-bonded to the jacket. Thus when the cable is under tension, the conductor splice connections (not shown) inside the closure would not be strained and therefore would not pull apart. The forces on the cable are transferred from the jacket of the cable to the splice closure through the collar. Furthermore, use of this collar as a strain relief is not limited to splice closure applications. The collar, melt-bonded to the cable jacket, also provides excellent strain relief for applications other than splices, such as electrical connectors. Another use of this collar is for strain relief at various points on long cable where it may pass through partitions, such as the bulkheads on a ship, as well as for other uses.

It has been shown that semi-conductive plastic material melted onto a cable jacket by passing an electric current through the material does not damage the jacket itself as was done in the use of prior art strain relief clamps. Furthermore, by localizing the heat source within the semi-conductive material itself, the danger of melting and damaging the jacket is alleviated since a separate external heat source is not used.

Figure 1:
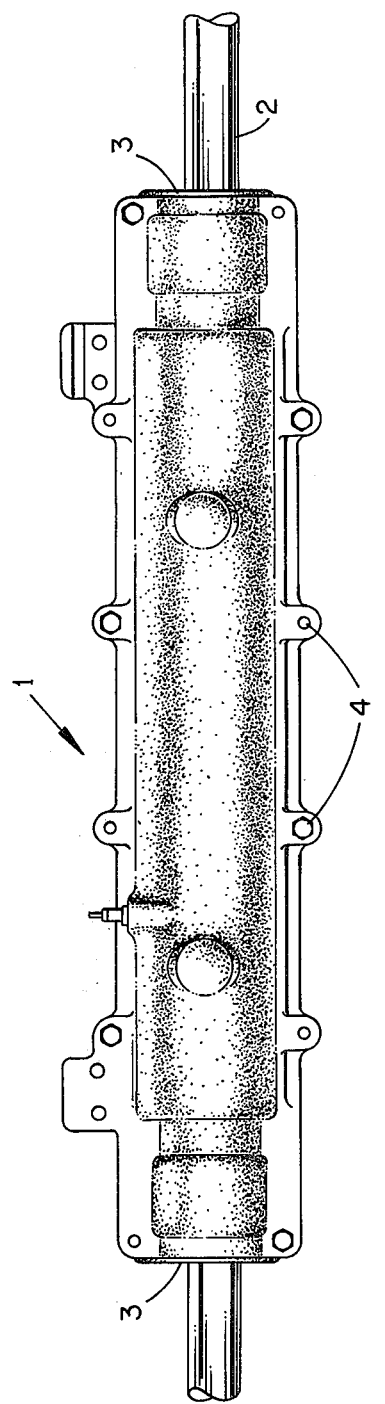
FIG. 1 is a top view of a standard telephone cable splice closure.
Figure 2:
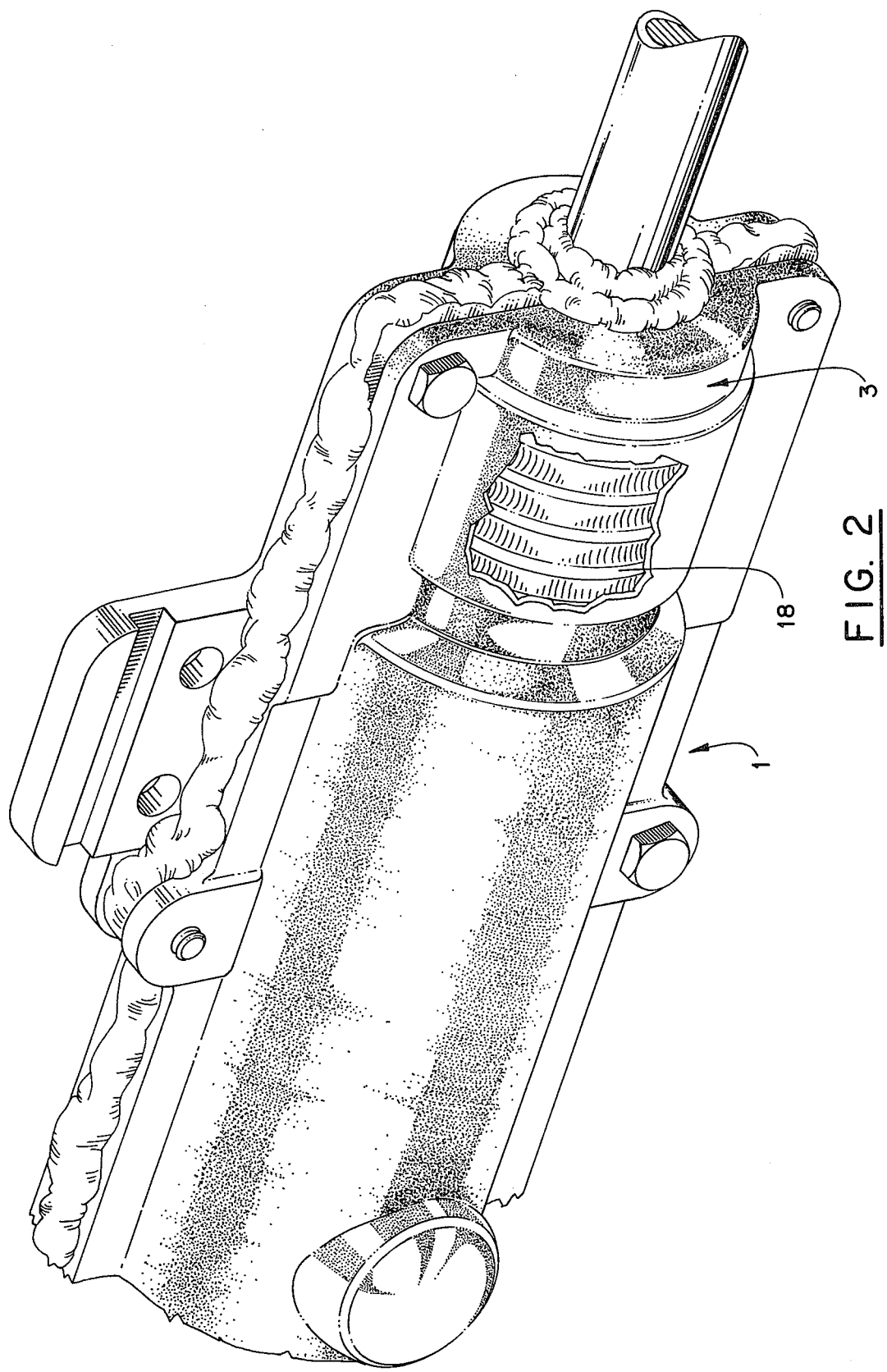
FIG. 2 is an isometric view of a portion of the telephone cable splice box of FIG. 1 with a part of the end portion removed showing some of the aspects of the invention.
Figure 8:
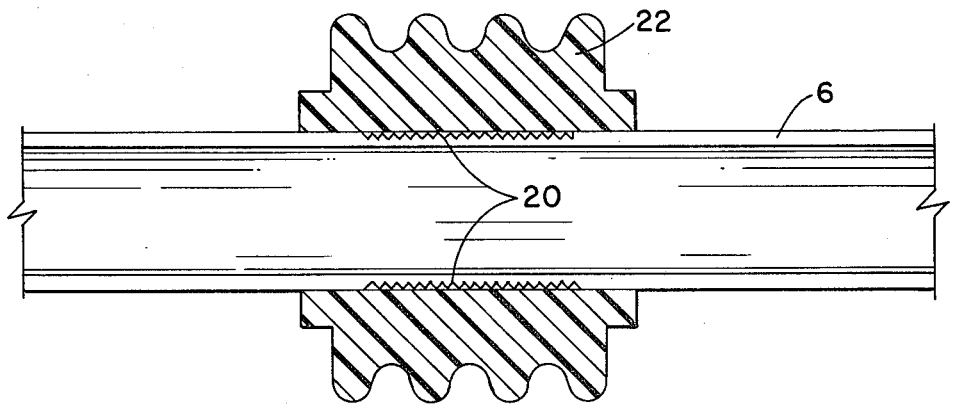
FIG. 8 is a side view of a gasket made of semi-conductive plastic material integral with the jacket of a cable.

The semi-conductive plastic may be formed into various configurations while in the molten state by the use of molds which are known to those skilled in the art. One example of a useful configuration is shown in FIG. 8. FIG. 8 shows the semi-conductive plastic member 22 which has been melt-bonded onto cable jacket 6 and has been formed in the shape of a gasket. The semi-conductive gasket then may be readily used in the place of the rubber gasket 18 shown in FIGS. 5 and 6. The semi-conductive plastic gasket 22 is integral with the cable jacket 6 and by itself provides the dual function of a moisture seal for the end 3 of the cable splice closure as shown in FIG. 2, as well as strain relief for the cable previously described.

From the foregoing description of the various embodiments of the invention, it will be apparent that many modifications may be made therein. These embodiments of the invention are intended as exemplification only and the invention is not limited thereto, except to the extent of the appended claims and equivalencies thereof.

I claim:

1. A method for providing a collar integral with a cable jacket including the steps of:
    applying a semi-conductive plastic material to the cable jacket;
    compressing said semi-conductive plastic material axially and radially;
    placing a pair of spaced apart electrodes on said material;
    passing electric energy from said electrodes through said material itself in sufficient quantity and for a sufficient time utilizing the conductive and the resistive qualities of said semi-conductive plastic material to melt-bond said material to the jacket.

2. A method as set forth in claim 1 wherein the semi-conductive plastic material is applied to the cable jacket by wrapping said jacket with semi-conductive plastic tape.

3. A method as set forth in claim 1 wherein the time and quantity of electrical energy are at least 200 watt-minutes for a material having a volume resistivity greater than 1 ohm-cm.

* * * * *